(12) United States Patent
Koreny (10) Patent No.: US 8,480,399 B2
(45) Date of Patent: Jul. 9, 2013

(54) GAME FOR TEACHING FINANCIAL SKILLS TO PLAYERS

(75) Inventor: Karel Koreny, Ostrava-Poruba (CZ)

(73) Assignee: KRESSON a.s. (CZ)

( * ) Notice: Subject to any disclaimer, the term of this patent is extended or adjusted under 35 U.S.C. 154(b) by 844 days.

(21) Appl. No.: 12/625,598

(22) Filed: Nov. 25, 2009

(65) Prior Publication Data

US 2011/0123963 A1    May 26, 2011

(51) Int. Cl.
*G09B 19/22* (2006.01)

(52) U.S. Cl.
USPC .......................................................... 434/128

(58) Field of Classification Search
USPC .................. 434/107, 110, 128, 129; 273/236, 273/243, 256, 278
See application file for complete search history.

(56) References Cited

U.S. PATENT DOCUMENTS

| | | | |
|---|---|---|---|
| 4,840,382 A * | 6/1989 | Rubin | 463/9 |
| 4,932,668 A | 6/1990 | Stewart | |
| 5,056,792 A * | 10/1991 | Helweg-Larsen et al. | 273/278 |
| 5,071,135 A * | 12/1991 | Campbell | 273/256 |
| 5,139,269 A | 8/1992 | Peterson | |
| 5,407,207 A | 4/1995 | Stanford | |
| 5,829,746 A | 11/1998 | Pacella | |
| 5,829,747 A * | 11/1998 | Nebel | 273/256 |
| 5,934,674 A * | 8/1999 | Bukowsky | 273/278 |
| 6,032,957 A | 3/2000 | Kiyosaki et al. | |
| 6,106,300 A * | 8/2000 | Kiyosaki et al. | 434/107 |
| 6,375,466 B1 * | 4/2002 | Juranovic | 434/107 |
| 6,764,077 B1 | 7/2004 | Miravete | |
| 6,767,210 B2 * | 7/2004 | Joffe | 434/107 |
| 6,769,691 B1 | 8/2004 | Kim | |
| 6,962,336 B2 * | 11/2005 | Glass | 273/256 |
| 7,914,286 B2 * | 3/2011 | Lees | 434/107 |
| 8,118,598 B2 * | 2/2012 | Rogan et al. | 434/107 |

* cited by examiner

*Primary Examiner* — Kurt Fernstrom
(74) *Attorney, Agent, or Firm* — Reinhart Boerner Van Deuren s.c.

(57) ABSTRACT

A game is disclosed which teaches a comprehensive understanding of fundamental aspects of personal (family) finances—including insurance, working with debt, investing and securing financial objectives, and which enables players to understand principles upon which significant wealth may be accumulated, and also teaches financial advisors how to organize finances of their clients. The game teaches skills concerning personal finances, including insurance, working with debt and investing, and securing financial objectives. The game also teaches the fundamental aspects of working with the cash flow one has, and it teaches players to understand principles upon which significant wealth may be accumulated.

18 Claims, 6 Drawing Sheets

Peter, Pamela and Peggy Pennies ★★★
Age: 30, child 1 year old

Peter and Pamela want a better future. They live quite modesty and slowly save penny by penny towards their financial independence. They regularly buy Money Market Fund's shares. When they learned Peter was going to lose his job, they decided to take out a consumer loan.

Family Finances:
| | | | |
|---|---|---|---|
| Husband's Net Wage: | $2,000 | Expenses: | $2,000 |
| Wife's Net Wage: | $1,000 | Net Rent: | $500 |
| Cash Flow: | $460 | | |

Assets and Liabilities:
Cash:                  $2,500
Money Market Funds:    30 shares
Consumer Loans:        $4,000       (2 x $2,000)

Clients' Objectives:
Three-bedroom apartment: $150,000   (want to accomplish by the age of 39)
Vacation in Egypt:       $15,000    (want to accomplish by the age of 48)
Financial Independence:  $175,000   (want to accomplish by the age of 60)

BOND FUND'S NAV per share and dividends

- 1 share $1500
- 5 shares $8,000
- 10 shares $50,000

FIG. 8B

BOND FUND'S SHARE SPLIT — 33

The maximum price was reached and needs to be adjusted. The share split ratio is 1:2. Take twice the original amount of bond fund's shares. Reduce the price by 50 % and go back to Card 14. Roll the dice to determine your next move.

FIG. 8C

BOND FUND'S SHARE REVERSE SPLIT — -7

The minimum price was reached and needs to be adjusted. The share reverse split ratio is 2:1. Give back half of your bond fund's shares. Share price doubles. Go to Card 12 and roll the dice to determine your next move.

FIG. 9A

MORTGAGE 2.5 %
(short-term)

| Principal: | $xxx |
|---|---|
| Maturity: | 15 years |
| Monthly Installment: | $xxx |

Age when the contract was signed:
*(circle)*

| 30 | 33 | 36 | 39 | 42 |
|---|---|---|---|---|
|  | 45 | 48 | 51 | 54 |

Mortgage balance at 60: (according to age when the contract was signed):

| Contract signed | Balance |
|---|---|
| 48 | $xxx |
| 51 | $xxx |
| 54 | $xxx |

Additional information:
*Premature repayment is possible. For the premature repayment's balance see the other side.*
Contract conclusion: Move xx spaces backward
Contract cancellation: Move xx spaces forward

FIG. 9B

MORTGAGE 2.5 %
(long-term)

| Principal: | $xxx |
|---|---|
| Maturity: | 30 years |
| Monthly Installment: | $xxx |

Age when the contract was signed:
*(circle)*

| 30 | 33 | 36 | 39 |
|---|---|---|---|

Mortgage balance at 60: (according to age when the contract was signed):

| Contract signed | Balance |
|---|---|
| 33 | $xxx |
| 36 | $xxx |
| 39 | $xxx |

Additional information:
*Premature repayment is possible. For the premature repayment's balance see the other side.*
Contract conclusion: Move xx spaces backward
Contract cancellation: Move xx spaces forward

FIG. 10

Consumer Loan
OVERDRAFT

Withdrawal: $2,000
Real Interest Rate: 12% p.a.
Monthly Interest: $20

Additional information:
Only interest is paid.
Loan repayment: At anytime you may pay back $2,000 to bank.

Contract conclusion:
Move 2 spaces forward
Contract cancellation:
Move 2 spaces backward

FIG. 11A

Mutual Fund
Bond Stock
Money Market 1 share

Buy and sell price:
Actual NAV per share of 1 share.

FIG. 11B

Mutual Fund
Bond Stock
Bond Market 1 share

Buy and sell price:
Actual NAV per share of 1 share.

FIG. 11C

Mutual Fund
Bond Stock
Stock Market 1 share

Buy and sell price:
Actual NAV per share of 1 share.

FIG. 12

Pension Plan

Monthly Premium: $xxx

Check the appropriate box with the age when the contract was concluded:

| Age | Insured sum | Age | Insured sum |
|---|---|---|---|
| 30 | $xxx | 45 | $xxx |
| 33 | $xxx | 48 | $xxx |
| 36 | $xxx | 51 | $xxx |
| 39 | $xxx | 54 | $xxx |
| 42 | $xxx | 57 | $xxx |

Additional Information:
*At age 60 the insured sum is paid out.*
*For the surrender value of the prematurely cancelled contract see the other side.*

Contract Conclusion: Move xx spaces backward
Contract Cancellation: Move xx spaces forward

FIG. 13

Permanent Life Insurance
(for Males)

Monthly Premium: $xxx

Check the appropriate box with the age when the contract was concluded:

| Age | Insured sum | Age | Insured sum |
|---|---|---|---|
| 30 | $xxx | 45 | $xxx |
| 33 | $xxx | 48 | $xxx |
| 36 | $xxx | 51 | $xxx |
| 39 | $xxx | 54 | $xxx |
| 42 | $xxx | 57 | $xxx |

Additional Information:
*At age 60 the insured sum is paid out.*
*For the surrender value of the prematurely cancelled contract see the other side*

Contract Conclusion: Move xx spaces backward
Contract Cancellation: Move xx spaces forward

FIG. 14

Term Life Insurance
(for Males)

Insured Sum: $xxx
Monthly Premium: $xx

Contract Conclusion:
Move xx spaces backward

Contract Cancellation:
Move xx spaces forward

FIG. 15

Disability Insurance with progressive loss payment
(for man)

Insured Sum: $xxxx
Monthly Premium: $xx

Contract Conclusion:
1 space backward

Contract Cancellation:
1 space forward

FIG. 16

Property Insurance
(for any sole Real Estate)

Monthly Premium: $xx

Additional Information:
Insurance covers damage to property and household content (own or someone else's)

Contract Conclusion:
Move xx space backward

Contract Cancellation:
Move xx space forward

FIG. 17

GAME FOR TEACHING FINANCIAL SKILLS TO PLAYERS

BACKGROUND OF THE INVENTION

Field of the Invention

This invention relates to a game which teaches a comprehensive understanding of fundamental aspects of personal (family) finances—including insurance, working with debt, investing and securing financial objectives, and which enables players to understand principles upon which significant wealth may be accumulated, and also teaches financial advisors how to organize finances of their clients.

It is well known that many families do not have any kind of financial plan for handling personal finances. As a result they often have difficulties in achieving objectives that would improve their standard of living and enable them to achieve financial independence before retiring. Most families are prone to live day-by-day and do not consider reaching financial independence to be an achievable goal. Many tend to rely on the government-paid pensions after retirement instead of their own personal funds. Some individuals ultimately gain some financial skills with their experience, however many others do not.

Obviously, people are able to improve their financial skills and thus, their chances to improve their standard of living. They can achieve financial independence either by attending complicated, costly, and time-consuming seminars organized by financial advisors, or they can hire a financial advisor. However, sometimes, even professional financial advisors do not understand all the aspects of personal finances properly and they tend to recommend certain financial products automatically, not taking into account the specific financial situation of their clients.

Therefore, it would be desirable to have a means of teaching financial skills to people in a more approachable way in a shorter period of time which would be easily accessible, as well as a means of simulating diverse financial situations, which would be useful both to normal players and to the financial advisors. The present invention aims at providing such means.

Similar attempts of teaching financial skills by means of games have already been done in the past. For example U.S. Pat. No. 6,032,957, to Kiyosaki et al., discloses a game for teaching financial skills called Cashflow. Another example is the Game of Life described by U.S. Pat. No. 5,407,207, to Stanford. However, these games suffer from several disadvantages. On one hand, they are too simplified, and they do not precisely reflect the reality of personal finances. On the other hand, they require complex calculations of personal finances. The present invention overcomes these disadvantages and presents an easily-played, yet very real game, which is in fact a simulation of managing personal finances.

SUMMARY OF THE INVENTION

This invention provides a game that teaches skills concerning personal finances, including insurance, working with debt and investing and securing financial objectives. The game also teaches the fundamental aspects of working with the cash flow one has, and it teaches players to understand principles upon which significant wealth may be accumulated.

Another object of this invention is to teach financial advisors how to better organize the finances of their clients.

Another object of this invention is to provide a tool which can provide simulating financial situations of different families and for experimenting with different financial strategies.

Another object of the invention is to simulate the economic reality of the family with a set of financial products based on financial products available in their particular country.

It is a further object to provide a game which leads to self-learning of the skills without the need of intervention of an instructor. It can, however, be played with the help of a qualified instructor.

It is a further object to provide a game where it would not be necessary to use pen and paper to play.

The above objectives are achieved by a game where each player is assigned a client with a certain financial situation and certain goals to be achieved, wherein the game is played in several periodically repeating phases, each period or round representing a predetermined number of months or years, the game comprises means representing at least one real financial product which influences the cash flow of the player, a set of virtual events influencing the financial situation of the player, virtual money, and a means for determining random changes in Net Asset Value ("NAV") per share and dividends of mutual funds.

The financial situation of the clients typically comprises specific incomes, expenses, cash flow, assets, and liabilities, all of which are typically documented on a pre-determined game card. The "typical" financial situation is based on an accumulation of corresponding data from real-life families.

The client is typically represented as a family unit—meaning a couple and their child.

The game according to the invention simulates the real life of a family in the course of virtually the whole productive life span of the parents. The game according to the invention also simulates financial products offered by banks, insurance companies and other financial institutions. The game also simulates situations of financial markets. The changes in NAV per share and dividends of equity funds correspond to the historical evolution of financial markets in the U.S. The game takes into account events that affect the finances of people in the U.S. and in other countries and encourages players to react as their counter-parts would be required to. The game also simulates chances or fiscal opportunities that people in the U.S. and in other countries may take.

The game according to the invention simulates the real needs of people in the course of their lives and teaches players to correctly manage their finances and their property. The game according to the invention simulates changes in the age of people and their ever-changing needs.

The game also simulates existing financial products, such as mortgages, mutual funds, equity funds, bond funds, and money-market funds, insurance products, credit products, saving products.

For the sake of easier manipulation and authenticity, each financial product may be symbolized by a game card which is traded (either bought or sold).

Players are taught the management of their finances by means of the game according to the invention. The game teaches the players to combine correctly and in the appropriate rate the three main sets of knowledge from the field of financial literacy: systematical investments, securing one's incomes and property, and working with good and bad debts. Random events can only accelerate, or on the other hand defer the achievement of objectives in the game. A correct strategy should always lead to a success, whereas an incorrect strategy should fail.

The game can be played with a board and figurines, but it can be also played without them, and it can also be played as a computer game, preferably online through the Internet.

If the game is played as a board game, the game board comprises namely: a line, preferably in the form of a "U ramp" representing the plurality of cash flow; and further also: a line representing the predetermined years; charts determining the changes in NAV per share and dividends of share, equity and money market funds; a circle determining the phases of the game; and slots for placing cards. The "U ramp" is a U-shaped area divided into a plurality of spaces each of which represents a cash flow rate varying from a most negative cash flow at a first end of the U-shaped area to a most positive cash flow at a second end of the U-shaped area opposite the first end of the U-shaped area.

The line or "U ramp" representing the plurality of cash flows has two lines of numbers—the first one represents the monthly cash flow. The second line represents the multiplier of the monthly cash flow resulting in the cash flow for the predetermined number of years.

The financial situation of players is defined by their position on the line, or "U ramp" showing plurality of cash flows. In the upper left corner of the "U ramp" is the most negative cash flow, whereas in the upper right corner of the "U ramp" is the most positive cash flow, the standard cash flow being placed in the middle. If the cash flow of a player increases over or decreases below the margins of the line or "U ramp", there are specific cards that modify the cash flow for such players. Each positive change of the cash flow (for example by paying debts, or mortgage) is represented by a shift of the figurine representing the player towards higher cash flow, whereas any negative change of the cash flow (for example by making new debts, or taking a mortgage) is represented by shift of the figurine representing the player towards lower cash flow.

Players place their figurines or other representations on the particular field with the corresponding cash flow, and they receive (or pay) the corresponding multiplier of their cash flow each round or turn.

Alternatively, the line or "U ramp" can be represented by their position on similar means other than a board with the equivalent function to the board.

The line representing the predetermined years shows the years when the rounds take place. Typically, each round comprises 3 years, but it can also take a longer or shorter period of time, for example 5 years, 2 years, 18 months, or a year. The interval comprised by one round is essential for determining the multiplier for cash flow.

The age of characters is typically set to 30 years in the beginning of the game, which corresponds to the age when people typically start their own family and have to solve their financial situation. At this age there is the short-term goal of buying a freehold estate, and also the long-term goal of accumulating sufficient wealth and thus achieving financial independence prior to retiring, i.e. typically prior to 60 years of age. Thus, the span of the game is typically from 30 to 60 years of age. However, it can be modified in both directions.

The family originally lives in a rented house or apartment where they have to pay a certain rent and it has the following objectives to achieve: the first objective is to buy a freehold estate—preferably this objective is to be achieved within 9 years, i.e. by the age of 39; the second objective is to buy a certain commodity improving the level of living, such as education for children, an extraordinary holiday, a recreation estate, or commodities improving the household—preferably this objective is to be achieved within 18 years, i.e. by the age of 48; and the third objective is to achieve financial independence, i.e. a certain amount of assets, prior to the retirement age, i.e. by the age of 60 (usually 30 years from the start of the game).

The players in their attempt to achieve the objectives may buy, sell, and use the financial products—mortgages, mutual fund shares of equity funds, bond funds, and money-market funds, insurance products, credit products, and saving products. To this purpose, players have virtual money.

Players can choose from mortgages with different terms, and thus from different monthly installment levels (each with a different impact on the cash flow). Typically, they can choose from 15-year and 30-year mortgages.

Some financial products, such as equity funds, bond funds, and money-market funds involve a one-time investment and their purchase or sale is reflected only in the amount of virtual money the player has. Other financial products, such as mortgages, insurance products, credit products, saving products, are reflected also by the respective position on the line, or "U ramp" representing the plurality of cash flows, as these products involve a change in the cash flow (mortgage payments, insurance rate, installments, and regular deposits).

The advantage of the game is that it teaches and encourages correct financial strategies. Unlike the previously disclosed games, such as Cashflow and Game of Life, players of this game achieve a result which is mostly determined by their own financial skills and personal strategy. Only very few aspects of the game are determined randomly. Even negative effects of the randomly defined events (changes in NAV per share and dividends of funds, or negative virtual events) may be neutralized by a correct strategy, whereas one can hardly achieve the goal if the strategy is incorrect, even with the help of positive randomly defined events.

The game is typically played in five periodically repeating phases: 1) a phase including increasing the age of the clients (aging phase); 2) a phase including receiving the money earned during the period of time (money-paying phase); 3) a phase including changes in NAV per share and dividends of mutual funds (NAV phase); 4) a phase including events in the life of the client (event phase); and 5) a phase including investment and other transactions (transaction phase).

If the game is played as a board game, the current phase is reflected in a circle on the board.

In the aging phase, the age is increased by the predetermined amount of years. The change in ages is then represented preferably on the line representing the predetermined years on the game board.

In the money-paying phase, players receive their monthly cash flow, multiplied by the number of months corresponding to the predetermined amount of years. In case of negative cash flow, players must return to the bank their monthly cash flow, multiplied by the number of months corresponding to the predetermined amount of years.

In the NAV Phase, the NAV and dividends per share of equity funds, bond funds, and money-market funds are defined for the players. One roll of two dice defines the change in NAV per share and dividends paid by equity funds. NAV's per share are directly proportional, in which case the higher the number rolled, the bigger the increase in NAV per share and dividends paid. The lower the number rolled, the bigger the decrease in NAV per share and dividends. A second roll of the two dice defines the changes in NAV per share and dividends of bond funds and money-market funds. The higher the number rolled, the bigger the increase in NAV per share and dividends of bond funds, but the bigger the decrease in money-market funds. The lower the number rolled, the bigger the decrease in NAV per share and dividends of bond funds, but the bigger the increase in money-market funds. It thus will become clear to the players how the NAV per share and dividends of bond funds and money-market funds are dependent on each other by nature of indirect proportions.

The new NAV per share and dividends paid by mutual fund shares are reflected by the shift in cards representing the NAV per share and dividends of mutual fund shares.

In the event phase, each player selects an event from a group of events. Events may either relate to the client of the player who selected them, or they can influence all players and their respective clients. The selection of the events is random, and the cards' contents can be either positive or negative for a player.

Event cards simulate the random factors in the life of the family. There are several different types of events: "bad days" (grey)—which represent negative events that may occur, such as illness, accidents, death, loss of employment, damages to the property, etc.; "opportunities" (light blue)—which simulate opportunities or chances that players have the option to take; "bonuses" (dark blue)—which represent supplemental payments the players may receive; "uninfluenceable events" (green)—which usually apply to all players and cannot be influenced by any steps taken by the players; "macroeconomic events" (red)—which apply to all players and represent events such as inflation, changes in interest rates, etc.; "expenses" (yellow)—which simulate expenses for small items or luxuries which the family buys; and "children" (beige)—which simulate a birth of another child.

In the transaction phase, players can make an unlimited number of transactions for their clients. They are limited solely by the assets of their clients. This is another advantage over the prior art where it was possible only to make financial transactions following a specified event.

Another advantage of the game is that players do not have to consider inflation themselves. The game mechanisms will factor inflation through the changes of rates, in the rates of mortgages, credit products, and saving products.

DESCRIPTION OF THE DRAWINGS

These and other advantages of the present invention are best understood with reference to the drawings, in which.

DETAILED DESCRIPTION OF THE EXEMPLARY EMBODIMENTS

Figure 1:
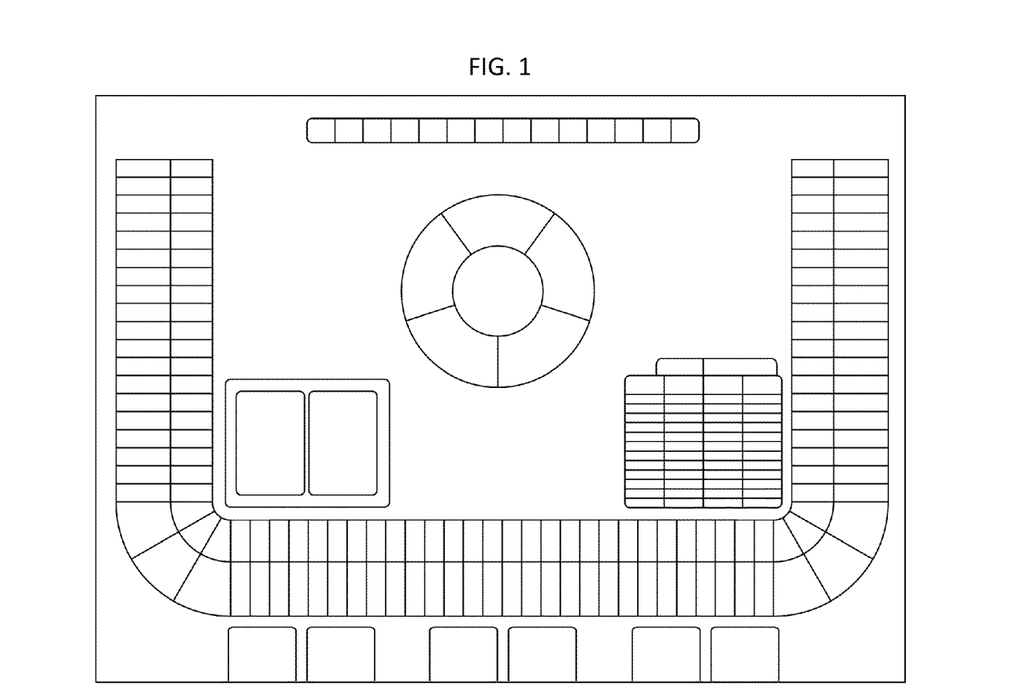
FIG. 1 represents an overall picture of the game board, which comprises a "U ramp," a line representing the predetermined years, and a circle determining the phases of the game.

The game comprises the following elements: 1) a game board which comprises a "U ramp," a line representing the predetermined years, and a circle determining the phases of the game; 2) a quantity of family cards depicting clients; 3) figurines; 4) two stones; 5) product cards; 6) event cards; and 7) virtual banknotes.

Before starting playing, the game board is opened.

The age of clients is represented by the position of a stone on a line representing the predetermined years, starting from the age of 30.

Figure 3:
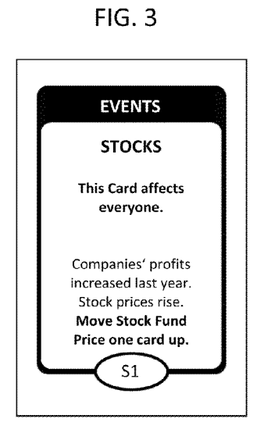
FIG. 3 represents an Event Card.

The Event Cards are shuffled and placed face-down on the appropriate place on the game board. The place adjacent to it serves for placing Event Cards used throughout the course of the game.

Figure 8A:
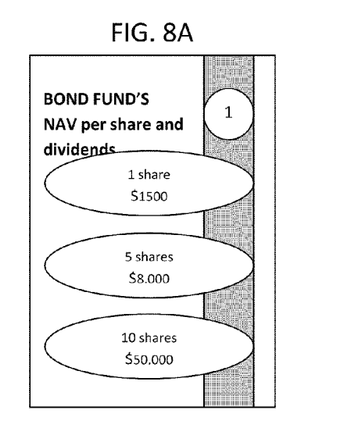
FIG. 8A represents a Mutual Fund NAV per share and dividends Card—money-market, bond, or equity, which card simulates the NAV per share of mutual fund shares and dividends per share.
Figure 8B:
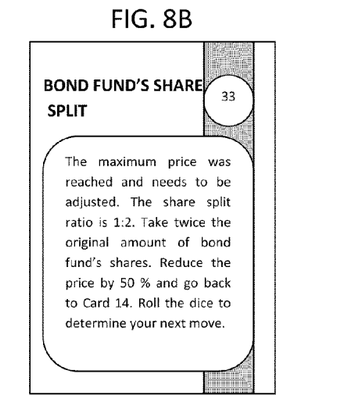
FIG. 8B represents an example of a NAV per share and dividends Card—money-market, bond, or equity, a split of shares, which card is used when the price of shares increases above the maximum price mentioned.
Figure 8C:
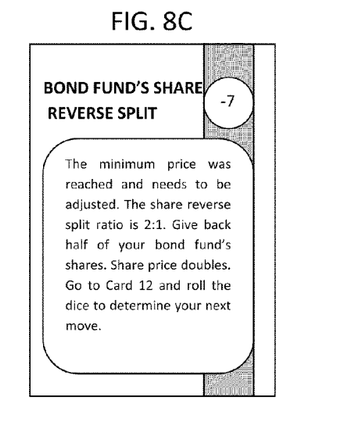
FIG. 8C represents an example of a NAV per share and dividends Card—money-market, bond, or equity, a merger of shares, which card is used when the price of shares decreases below the minimum price mentioned.
Figure 9A:
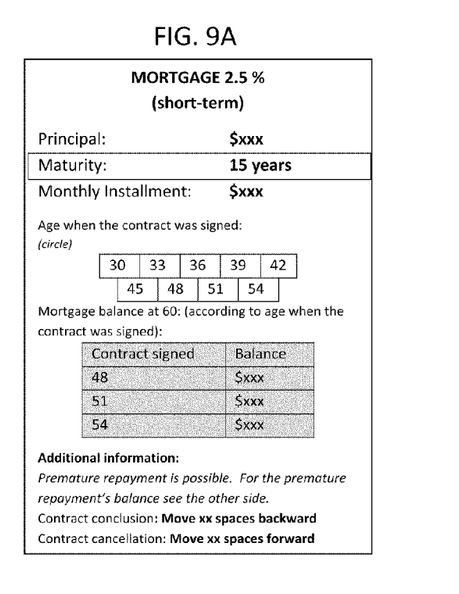
FIG. 9A represents a Product Card—Mortgage 2.5% (short-term), which simulates a mortgage with 15-year maturity.
Figure 9B:
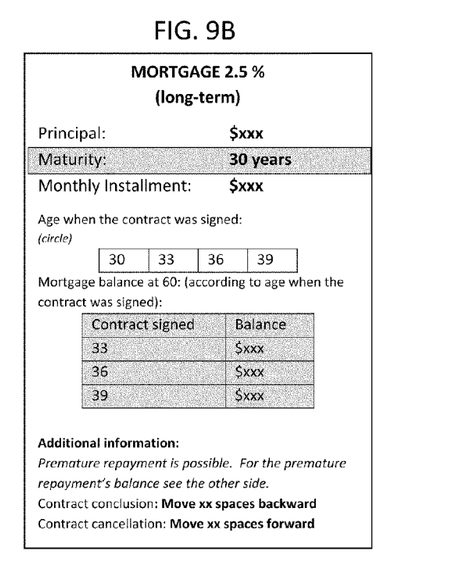
FIG. 9B represents a Product Card—Mortgage 2.5% (long-term), which simulates a mortgage with 30-year maturity.
Figure 10:
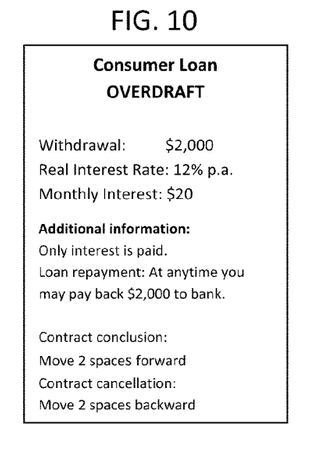
FIG. 10 represents a Product Card—Consumer Loan, which simulates short-term consumer loans and credit cards.
Figure 11A:
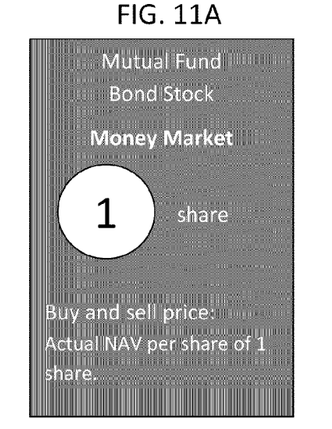
FIG. 11A represents a Product Card—Money market Mutual Fund, which simulates a certain share on the assets of the Money Market Mutual Fund.
Figure 11B:
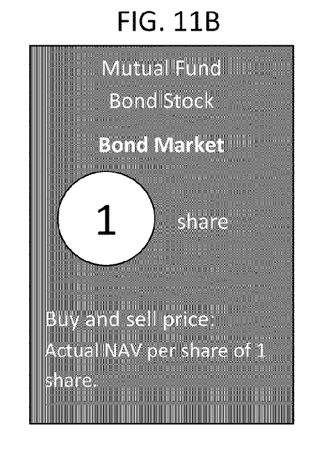
FIG. 11B represents a Product Card—Bond Mutual Fund, which simulates a certain share on the assets of the Bond Mutual Fund.
Figure 11C:
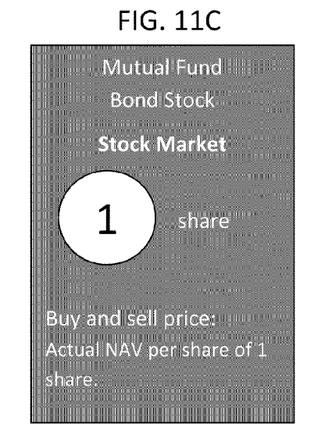
FIG. 11C represents a Product Card—Equity Mutual Fund, which simulates a certain share on the assets of the Equity Mutual Fund.
Figure 12:
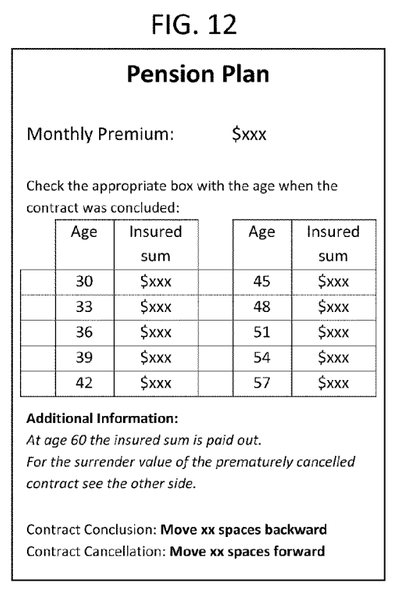
FIG. 12 represents a Product Card—Retirement Plan, which simulates retirement plans used in the U.S.
Figure 13:
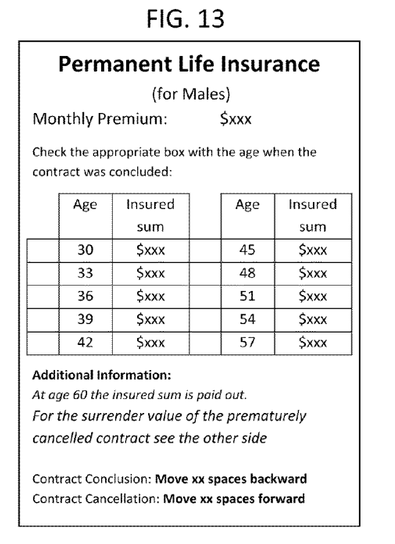
FIG. 13 represents a Product Card—Permanent Life Insurance, which simulates life insurance for the event of death endowment insurance.
Figure 14:
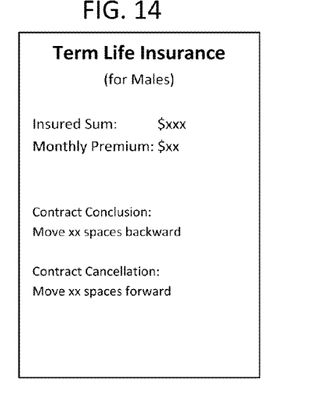
FIG. 14 represents a Product Card—Term Life, which simulates life insurance in the event of death.
Figure 15:
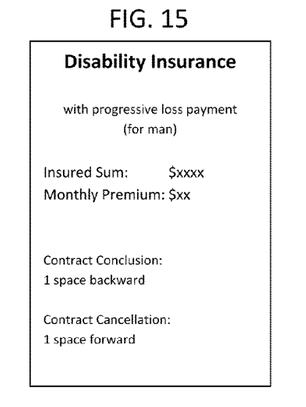
FIG. 15 represents a Product Card—Disability Insurance, which simulates insurance for cases with progressive loss payment.
Figure 16:
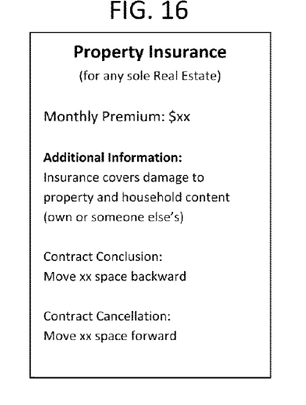
FIG. 16 represents a Product Card—Property Insurance, which simulates insurance for cases of any damages on the property of the family of the client.

The cards with NAV per share and dividends of mutual funds are ordered from the lowest number to the highest number and are placed on the appropriate places.

Figure 17:
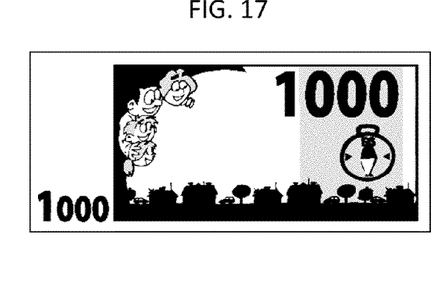
FIG. 17 represents an example of the banknote used in the game.

Banknotes are sorted according to their nominal values and placed near the game board. A "banker" is appointed from amongst the players.

Product Cards, including mutual fund shares, insurance products, consumer loan products and mortgages are also placed near the game board.

Figure 2:
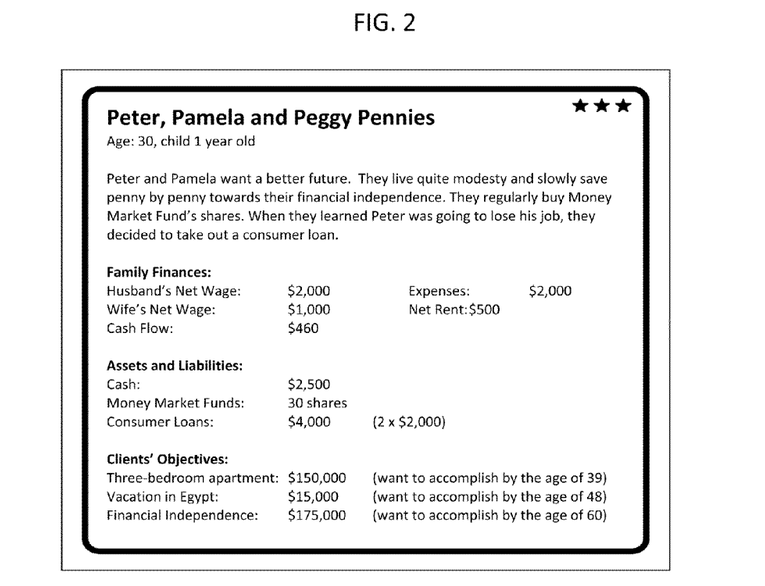
FIG. 2 represents the front side of a Family Card, which comprises the basic characteristics and financial data of the family (name of family members, their age, family finances, assets and liabilities, and objectives)

At the beginning of the game, players are assigned a client (either at random or by their choice), and each player receives the Family Card corresponding to the client. This card details the necessary information about the client, including the objectives of the client and the financial situation of the client. Clients (families) are differentiated according to the difficulty of achieving their objectives. This differentiation is preferably shown by asterisks in the upper right corner of the client card. Clients with the easiest objectives are marked with one asterisk, whereas clients with the most difficult objectives are marked with three asterisks.

From the Banker each player receives cash corresponding to the amount of cash their client is to receive. Each player also receives the appropriate number of shares of Mutual Funds and Consumer Loans Cards. Each player also receives three cards with the objectives of their client and places them grey side up in front of them. When an objective is achieved, the card may be turned grey side down. Each player also receives a Rental Contract Card for the estate where the client lives at the beginning of the game. Lastly, each player receives a Child Card.

The cash flow of the client of each player is then reflected by the position of the representation of the client (for example a figurine or a pawn) on the "U ramp" representing the plurality of cash flows.

The game is played in eleven rounds—the initial round, nine full rounds, and the final round.

Each round consists of five phases: a) change of age; b) receiving the money earned during the three years; c) changes in NAV per share and dividends of mutual funds; d) events; and e) transactions.

Each round, the clients of players age virtually by 3 years.

The current phase is reflected by the position of a stone in a circle, representing these phases.

The initial round has only the transactions phase.

The final round has the same phases as regular rounds, however the transactions phase differs.

Figure 4A:
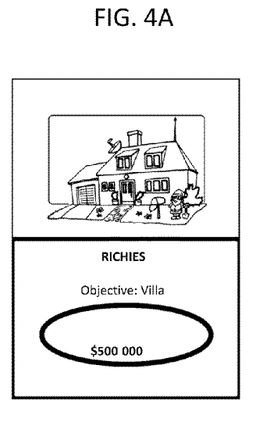
FIG. 4A represents a front side of an Objective Card, which is in a single color and lists the name of the family, their objective, and the amount of funds necessary to accomplish their objective.
Figure 4B:
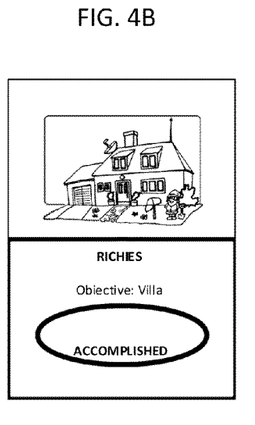
FIG. 4B represents a back side of an Objective Card, which is in full color and lists the name of the family, their objective, and the word "Accomplished;"
Figure 5:
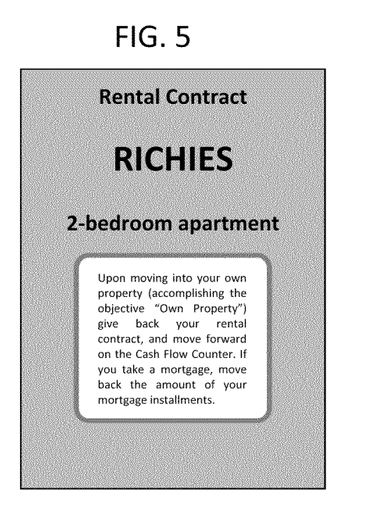
FIG. 5 represents the Rental Contract Card which defines the initial housing of the family.
Figure 6A:
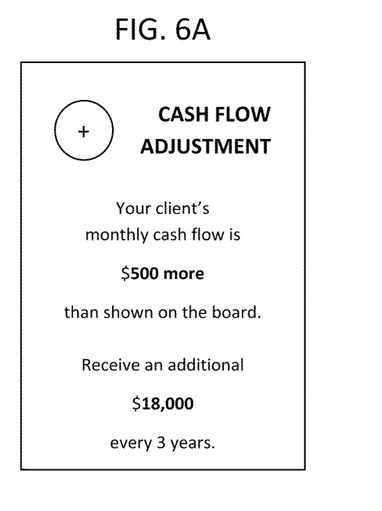
FIG. 6A represents the card Modification CASH FLOW plus, which can be used if the positive monthly cash flow exceeds $500.
Figure 6B:
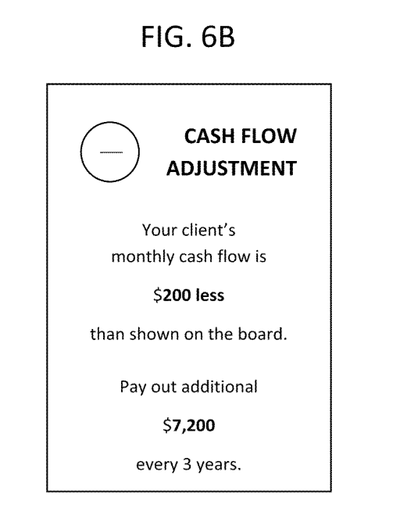
FIG. 6B represents the card Modification CASH FLOW minus, which can be used if the negative monthly cash flow exceeds $200.
Figure 7:
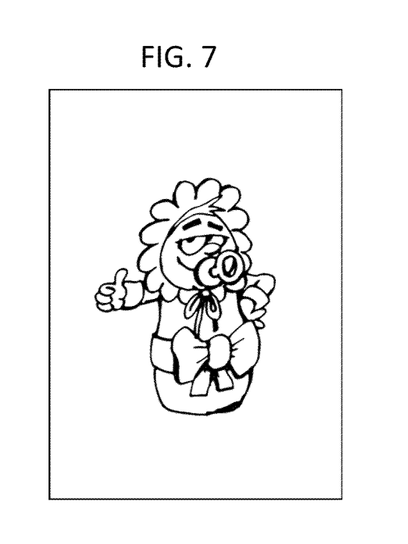
FIG. 7 represents a Child Card which simulates one child in the family.

By the fourth round (at the age of 39), it is necessary to achieve the objective connected with buying a freehold estate. If the freehold estate is indeed purchased, the Objective Card is to be turned grey side down. The objective may be achieved earlier, but at the latest must be completed by the conclusion of the fourth round.

By the seventh round (at the age of 48), it is necessary to achieve the secondary goal. Once the amount specified on the card of the second goal is paid out, the player can turn the Objective Card grey side down. The secondary goal may be achieved earlier, but at the latest must be completed by the conclusion of the seventh round.

By the final round (at the age of 60), the third objective, financial independence (i.e. the particular level of investment (capital) assets), is to be achieved. In the transactions phase of the final round, players convert all their financial products to cash, pay their debts, and calculate the accumulated assets. The freehold estate is not calculated into the assets, as the client is supposed to use it, and not sell it.

If the accumulated assets are higher than the objective, the objective has been achieved and the Objective Card may be turned grey side down.

The game may be adjusted according to the level of financial skills of players, for example by leaving out certain financial products, such as insurance products, or by leaving out certain Event Cards, such as "black days."

Although the game has been presented in this specification mainly as played on a physical game board, using physical dice, figurines, cards, etc., it should be understood that the game may be played also without these physical items—on a table where all important aspects are marked on such table, or on a computer, either in an offline version, or as an online version through the internet, wherein the various terms employed in the above description to identify physical components, such as "board," "figurines," "dice," "cards," "line," etc. should be understood to include electronic media equivalents.

All items (game board, cards, banknotes) representing different aspects of the game and depicted in the drawings of the present application should be understood as purely illustrative, as their embodiments may differ in sizes, shapes, arrangement, elements and components, and these drawings shall not limit the interpretation of the invention in any way.

The three-year round may be modified, either shortened (two years, one year, etc.) or lengthened (four years, five years, etc.), each modification obviously requires modification of the amount received, based on the multiplier of the cash flow and the number of months of the duration of the round.

Thus, while the principles of the invention have now been made clear in an illustrative embodiment, many modifications of structure, arrangement, proportions, elements, materials, and components are possible, which will enable a similar operation of the game, without departing from the above principles, and they will be obvious to persons skilled in the art.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A game for teaching financial skills to players, comprising:
   a board, wherein the board comprises at least a line representing a plurality of cash flows from a lowest cash flow at one end of the line to a highest cash flow at an opposite end of the line;
   figurines;
   means representing real financial products each of which influence the cash flow of a player;
   virtual money;
   means for initially assigning a player an initial financial situation and certain life objective(s) to be achieved in the game;

means defining virtual events influencing the financial situation of a player; and means for determining random changes in Net Asset Value ("NAV") per share and dividends of real financial products held by a player;

wherein the game is played in multiple rounds each of which has several periodically repeating phases, each round representing a predetermined number of months or years in the life of the player.

2. A game according to claim 1, wherein the financial situation of a player comprises at least:
  a defined income;
  defined expenses;
  a defined cash flow;
  defined assets; and
  defined liabilities.

3. A game according to claim 1, wherein means for initially assigning a player an initial financial situation comprises a game card.

4. A game according to claim 3, wherein the game card represents the financial situation of a family.

5. A game according to claim 1, wherein the financial products comprise one or more of:
  mortgages;
  mutual funds, including equity funds, bond funds, and money-market funds;
  insurance products;
  credit products; and
  saving products.

6. A game according to claim 1, wherein the financial products each comprise a game card.

7. A game according to claim 1, wherein the board further comprises:
  a second line representing the predetermined years;
  charts determining the changes in NAV per share and dividends of share, equity, and money market funds;
  a circle determining a plurality of aspects of each phase of the game; and
  slots for placing cards.

8. A game according to claim 1, wherein the line representing the plurality of cash flows is in the form of a "U ramp."

9. A game according to claim 1, wherein the cash flow of each player is represented by the position of the player's respective figurine on the line or "U ramp."

10. A game according to claim 1, wherein the life objective(s) comprise:
  purchasing a freehold estate;
  achieving a secondary goal improving the level of living; and
  achieving a particular level of investment (capital) assets.

11. A game according to claim 10, wherein the secondary goal of improving the level of living is at least one of the following objectives:
  securing education for children;
  enjoying an extraordinary holiday;
  purchasing a recreation estate; and
  improving the household.

12. A game according to claim 1, wherein the life objective(s) are to be achieved in a predetermined time.

13. A game according to claim 12, wherein the predetermined time is from 30 to 60 years of age as defined by multiple rounds beginning at 30 years of age and extending to 60 years of age.

14. A game according to claim 1, wherein the periodical repeating phases comprise at least:
  a phase including increasing the age of the player;
  a phase including receiving the money earned during the period of time represented by the round;
  a phase including changes in NAV per share and dividends of mutual funds;
  a phase including the occurrence of events in the life of the player; and
  a phase including investment and other transactions.

15. A game according to claim 1, wherein each round represents 3 years.

16. A game according to claim 1, wherein the changes in NAV per share and dividends of mutual funds are determined by a roll of 2 dice.

17. A game for teaching financial skills to players, comprising:
  a board having a "U ramp" which is a U-shaped area divided into a plurality of spaces each of which represents a cash flow rate varying from a most negative cash flow at a first end of the U-shaped area to a most positive cash flow at a second end of the U-shaped area opposite the first end of the U-shaped area;
  means for establishing an initial financial position for each player, the initial financial position including:
    an initial cash flow rate that can be represented by a game piece on one of the spaces of the U-shaped area of the board;
    an initial amount of assets including cash and/or shares of at least one of equity funds, bond funds, and money market funds; and
    a life objective to be achieved;
  wherein during each or a plurality of rounds the player's cash flow is adjusted in accord with the player's current cash flow rate;
    chance means to establish a change in values and/or payment of dividends on the player's shares of equity funds, bond funds, and/or money market funds, wherein during each round the player uses the chance means to so establish a change of values; and
    means defining a plurality of groups of events each of which simulate a random factor in the life of the players family that can have a positive, negative, or neutral financial impact on a player's assets, including changing the player's cash flow rate,
  wherein during each round the player selects an event from the group of events and, if the selected event so dictates, adjusts the game piece on the U-shaped area of the board;
  wherein during each round the player is allowed to purchase and/or sell shares of equity funds, bond funds, money market funds, and/or any other financial products; and
  wherein during each round the player is allowed to spend money to achieve a life objective.

18. A method of playing a game for teaching financial skills to players, the method comprising:
  providing a plurality of game elements comprising:
    a board comprising at least a line representing a plurality of cash flows from a lowest cash flow at one end of the line to a highest cash flow at an opposite end of the line;
    figurines;
    virtual money;
    means representing shares of at least one of equity funds, bond funds, and money market funds;
    means for initially assigning a player an initial financial situation and at least one life objective to be achieved in the game;
    event means defining virtual events influencing the financial situation of a player; and chance means for determining random changes in Net Asset Value ("NAV") per share and dividends of real financial products held by a player;

wherein the method comprises:

defining a starting position for the game for each player with the means for initially assigning a player an initial financial situation in which the player's cash flow rate is defined, the player is provided with an initial amount of assets including virtual cash and/or means representing shares of at least one of equity funds, bond funds, and money market funds, and at least one life objective is established for the player with the means for initially assigning a player at least one life objective to be achieved in the game;

providing each player with a plurality of rounds each of which rounds is representative of a period of time, each round for a player comprising:

providing the player with the player's cash flow during the period of time to either increase, decrease, or leave unchanged the player's assets;

using the chance means to establish a change in values and/or payment of dividends on the player's shares of equity funds, bond funds, money market funds, and/or any other financial products;

using the event means to select an event from a group of events each of which simulate a random factor in the life of the players family that can have a positive, negative, or neutral financial impact on a player's assets, including changing the player's cash flow rate;

allowing the player to purchase and/or sell shares of equity funds, bond funds, and/or money market funds; and allowing the player to spend the virtual money to achieve a life objective.

* * * * *